United States Patent
Church

(10) Patent No.: US 10,781,789 B2
(45) Date of Patent: Sep. 22, 2020

(54) STRUCTURE WITH RIGID WINGLET ADAPTED TO TRAVERSE A FLUID ENVIRONMENT

(71) Applicant: Ryan Church, Toronto (CA)

(72) Inventor: Ryan Church, Toronto (CA)

(73) Assignee: BIOMERENEWABLES INC., Toronto (CA)

(*) Notice: Subject to any disclaimer, the term of this patent is extended or adjusted under 35 U.S.C. 154(b) by 733 days.

(21) Appl. No.: 15/501,317

(22) PCT Filed: Aug. 5, 2015

(86) PCT No.: PCT/CA2015/050740
§ 371 (c)(1),
(2) Date: Feb. 2, 2017

(87) PCT Pub. No.: WO2016/019467
PCT Pub. Date: Feb. 11, 2016

(65) Prior Publication Data
US 2017/0218777 A1    Aug. 3, 2017

Related U.S. Application Data

(60) Provisional application No. 62/033,331, filed on Aug. 5, 2014.

(51) Int. Cl.
*F03D 1/06* (2006.01)
*B63H 1/28* (2006.01)
(Continued)

(52) U.S. Cl.
CPC ............. *F03D 1/0666* (2013.01); *B63H 1/28* (2013.01); *B64C 11/14* (2013.01); *B64C 11/18* (2013.01);
(Continued)

(58) Field of Classification Search
CPC ...... F03D 7/0236; F03D 7/024; F03D 7/0296; F03D 7/041; F03D 3/061; F03D 1/0633;
(Continued)

(56) References Cited

U.S. PATENT DOCUMENTS 2,014,032 A * 9/1935 Sharpe ................. F04D 29/384
416/228
2,472,357 A  6/1949 Wolf
(Continued)

FOREIGN PATENT DOCUMENTS

CN  101622446 A   1/2010
CN  102400845 A   4/2012
(Continued)

OTHER PUBLICATIONS

First Office Action received in Chinese Application No. 201580042030.1, dated Jul. 17, 2018.
(Continued)

*Primary Examiner* — David E Sosnowski
*Assistant Examiner* — Danielle M. Christensen
(74) *Attorney, Agent, or Firm* — Norton Rose Fulbright Canada LLP

(57) ABSTRACT

A structure adapted to traverse a fluid environment includes an elongate body having a root, a wingtip, a leading edge and a trailing edge; and a rigid winglet associated with the wingtip and having a winglet body extending substantially normal to one of a suction side and a pressure side of the elongate body to a termination point that is rearward of the trailing edge. In an embodiment, the structure is a rotor blade that may be incorporated into a wind turbine.

20 Claims, 15 Drawing Sheets

(51) Int. Cl.
    *B64C 11/18*     (2006.01)
    *B64C 11/14*     (2006.01)
    *B64C 23/06*     (2006.01)
    *F01D 5/14*     (2006.01)
    *F03B 3/04*     (2006.01)
    *F03D 3/06*     (2006.01)
    *F03D 7/02*     (2006.01)
    *F15D 1/00*     (2006.01)

(52) U.S. Cl.
    CPC ............ *B64C 23/072* (2017.05); *F01D 5/147* (2013.01); *F03B 3/04* (2013.01); *F03D 1/0633* (2013.01); *F03D 1/0675* (2013.01); *F03D 3/061* (2013.01); *F03D 7/0236* (2013.01); *F15D 1/0025* (2013.01); *F05B 2240/221* (2013.01); *F05B 2240/30* (2013.01); *F05B 2250/16* (2013.01); *F05B 2250/25* (2013.01); *F05B 2260/30* (2013.01); *F05B 2260/96* (2013.01); *Y02E 10/721* (2013.01); *Y02T 50/164* (2013.01)

(58) Field of Classification Search
    CPC ........ F03D 1/0675; F03D 1/064; F03D 1/065; B64C 11/14; B64C 23/072; B64C 23/069; Y02T 50/164; F05B 2260/96; F05B 2240/30
    See application file for complete search history.

(56) References Cited

U.S. PATENT DOCUMENTS

| | | | | |
|---|---|---|---|---|
| 4,457,479 A * | 7/1984 | Daude | .................. | B64C 5/08 244/203 |
| 4,662,823 A * | 5/1987 | Cooke | .................. | F04D 29/36 416/228 |
| 5,407,153 A * | 4/1995 | Kirk | .................. | B64C 23/069 244/199.4 |
| 5,533,865 A | 7/1996 | Dassen et al. | | |
| 7,931,444 B2 * | 4/2011 | Godsk | .................. | F03D 1/06 416/228 |
| 7,934,907 B2 * | 5/2011 | Aynsley | .................. | F04D 29/34 416/191 |
| 8,421,260 B2 * | 4/2013 | Duke | .................. | F03B 13/10 290/54 |
| 8,894,018 B2 * | 11/2014 | Boer | .................. | B64C 23/072 244/199.4 |
| 2002/0162917 A1 | 11/2002 | Heller et al. | | |
| 2003/0175121 A1 | 9/2003 | Shibata et al. | | |
| 2008/0008596 A1 * | 1/2008 | Aynsley | .................. | F04D 29/384 416/243 |
| 2008/0061192 A1 | 3/2008 | Sullivan | | |
| 2010/0008780 A1 | 1/2010 | Miocevich | | |
| 2011/0142642 A1 | 6/2011 | McGrath et al. | | |
| 2011/0158816 A1 | 6/2011 | Wobben | | |
| 2011/0223034 A1 | 9/2011 | Gerber et al. | | |
| 2011/0311363 A1 | 12/2011 | Bills et al. | | |
| 2012/0027595 A1 | 2/2012 | Pesetsky | | |
| 2012/0051916 A1 | 3/2012 | Bagepalli et al. | | |
| 2013/0170999 A1 * | 7/2013 | Vassilicos | .................. | F03D 1/0633 416/223 R |
| 2013/0251535 A1 | 9/2013 | Koegler et al. | | |

FOREIGN PATENT DOCUMENTS

| | | |
|---|---|---|
| CN | 102767469 A | 11/2012 |
| CN | 204024906 | 12/2014 |
| EP | 1375342 A1 | 1/2004 |
| EP | 2592265 A2 | 5/2013 |
| TW | 201210895 | 3/2012 |
| WO | WO02002935 A1 | 1/2002 |
| WO | WO2009018666 A1 | 2/2009 |
| WO | 2013083130 A1 | 6/2013 |
| WO | WO2014207015 A1 | 12/2014 |
| WO | 2015067387 A1 | 5/2015 |
| WO | WO2015067387 A1 | 5/2015 |

OTHER PUBLICATIONS

Supplementary European Search Report issued in European Patent Application No. 15829235.9, dated May 9, 2018.

* cited by examiner

STRUCTURE WITH RIGID WINGLET ADAPTED TO TRAVERSE A FLUID ENVIRONMENT

CROSS-REFERENCE TO RELATED APPLICATION

This application claims priority under 35 U.S.C. 119(e) from U.S. Provisional Patent Application Ser. No. 62/033,331 filed on Aug. 5, 2014, the contents of which are incorporated in their entirety by reference herein.

FIELD OF THE INVENTION

The following relates generally to structures adapted to traverse fluid environments, and more particularly to a structure adapted to traverse a fluid environment having an elongate body and a rigid winglet.

BACKGROUND OF THE INVENTION

Horizontal-axis wind turbines for generating electricity from rotational motion are generally comprised of one or more rotor blades each having an aerodynamic body extending outwards from a horizontal shaft that is supported by, and rotates within, a wind turbine nacelle. The rotor blades are examples of structures adapted to traverse a fluid environment, where the environment is primarily ambient air. The nacelle is supported on a tower which extends from the ground or other surface. Wind incident on the rotor blades applies pressure causing the rotor blades to move by rotating the shaft from which they extend about the horizontal rotational axis of the shaft. The shaft is, in turn, associated with an electricity generator which, as is well-known, converts the rotational motion of the shaft into electrical current for transmission, storage and/or immediate use. Horizontal-axis wind turbines are generally very well-known and understood, though improvements in their operation to improve the efficiency of power conversion and their overall operational characteristics are desirable.

Incident wind at even low speeds can cause the rotor blades to rotate very quickly. As would be well-understood, for a given rotational velocity, the linear velocity of a rotor blade is lowest in the region of its root—the portion of the rotor blade proximate to the shaft. Similarly, the linear velocity of the rotor blade is highest in the region of its wingtip—the portion of the rotor blade distal from the shaft. Particularly at higher linear velocities, aspects of the rotor blade can generate significant aeroacoustic noise as the rotor blade rapidly "slices" through air along its rotational path. This noise can be quite uncomfortable for people and animals in the vicinity to witness. However, the noise can also be an indicator that operation is not efficient, and maximum wingtip speed can actually be limited by such inefficiencies.

For example, aeroacoustic noise emitted from the region of the wingtip of a rotor blade is generally called tip vortex noise. Tip vortex noise is an indicator that a scattered vortex is being created due to the configuration of the rotor blade at the wingtip, which decreases the efficiency of the blade by creating undue drag.

It is known to modify the configuration of the rotor blade in the region of the wingtip, such as by having aspects of the rotor blade in the wingtip region deviate only from the generally linear path of the rest of the rotor blade at some angle. Such deviations have become known as winglets, and various configurations of winglets have been used to improve the efficiencies of wind turbines as a whole by limiting the vortices that may be created upon rotation of the rotor blades.

At the present time, such winglets are known to either deviate into the oncoming wind incident with the rotor blade or to deviate away from the oncoming wind in the direction of the tower, without going forward or rearward of the leading or trailing edges of the rest of the rotor blade. These two prevalent winglet configurations have been shown to reduce the load on the rotor blade and to reduce the chance of blade failure by allowing the wind that is incident on the rotor blade to exit the wingtip smoothly. However, such configurations have addressed only the handling of wind incident on the front of the rotor blades that causes the rotor blades to rotate, and have not considered improvements in how the rotor blades might operate in respect of the air that is encountered at high-speed by the rotor blades during their high-speed traversal of their rotational path. In particular, the wind incident on the front of the rotor blades may reasonably be moving at only up to about thirty (30) kilometres per hour (kph), whereas the linear speed of the wingtip region as it traverses its rotational path may reasonably reach up to three hundred and twenty (320) kph for a very rapidly-rotating rotor blade. The higher-speed in this respect can be responsible for the bulk of the noise and inefficiencies of a wingtip.

SUMMARY OF THE INVENTION

In accordance with an aspect, there is provided a structure adapted to traverse a fluid environment, the structure comprising an elongate body having a root, a wingtip, a leading edge and a trailing edge; and a rigid winglet associated with the wingtip and having a winglet body extending substantially normal to one of a suction side and a pressure side of the elongate body to a termination point that is rearward of the trailing edge.

In an embodiment, the winglet body is planar and is generally parallel to the tangent of a circle traversed by the wingtip during movement of the elongate body about a rotational axis. In an alternative embodiment, the winglet body is arced and generally conforms to an arc of circumference of a circle traversed by the winglet during movement of the elongate body about a rotational axis.

In an embodiment, the structure is a rotor blade that may be used in an aircraft or a turbine. In another embodiment, the structure is a fixed wing for an aircraft.

Other aspects and their advantages will become apparent to the skilled reader upon review of the following.

BRIEF DESCRIPTION OF THE DRAWINGS

Embodiments of the invention will now be described with reference to the appended drawings in which:

FIG. 9C is a side elevation view of a wingtip region of a structure in accordance with another embodiment, in isolation;

DETAILED DESCRIPTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
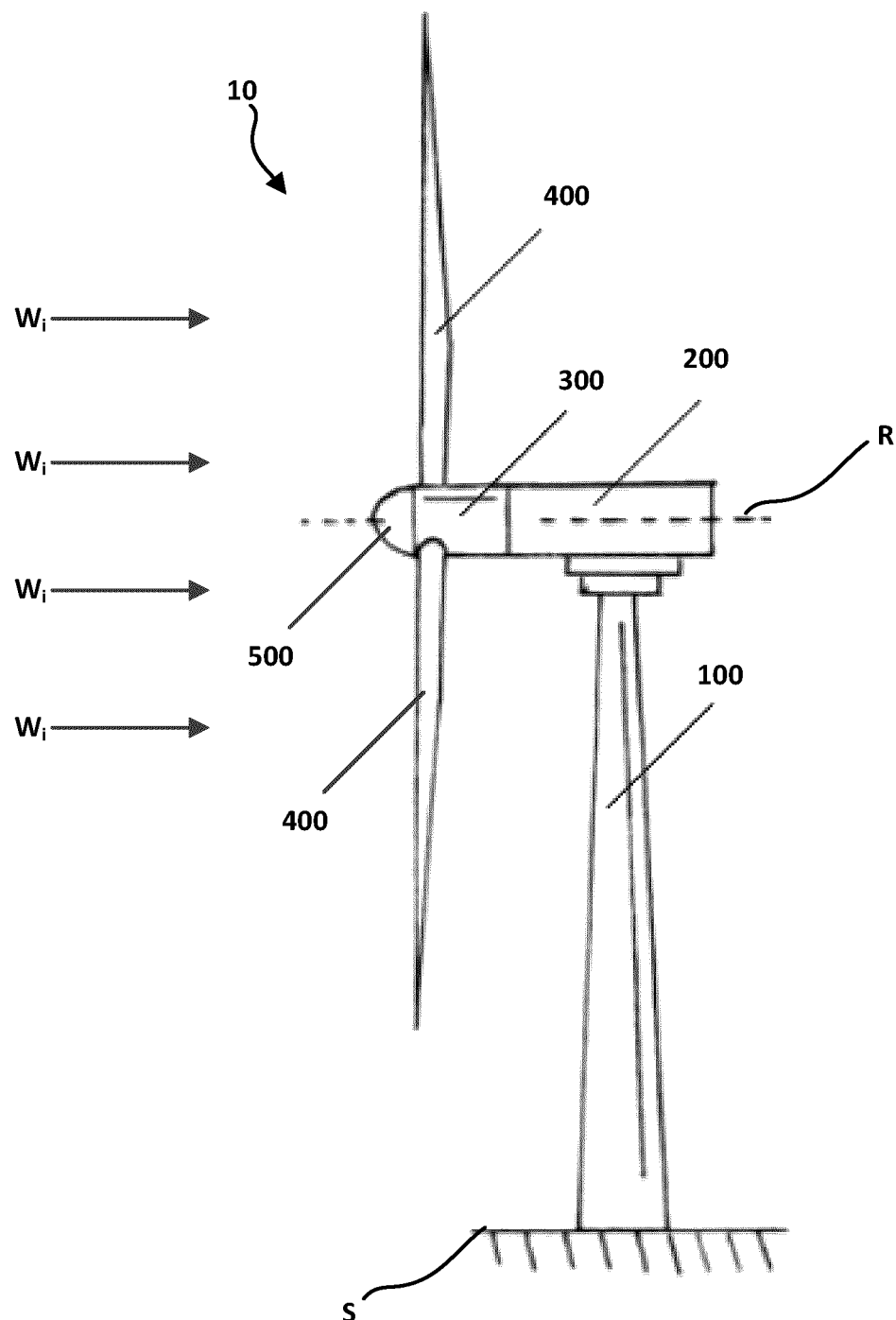
FIG. 1 is a side elevation view of a horizontal axis wind turbine, according to the prior art.

FIG. 1 is a side elevation view of a horizontal axis wind turbine 10, according to the prior art. Wind turbine 10 includes a tower 100 supported by and extending from a surface S, such as a ground surface. Supported by tower 100, in turn, is a nacelle 200 extending horizontally. A hub with a spinner 300 is rotatably mounted at a front end of nacelle 200 and is rotatable with respect to nacelle 200 about a rotation axis R. Spinner 300 receives and supports multiple rotor blades 400 that each extend outwardly from spinner 300. Rotor blades 400 catch incident wind W, flowing towards the wind turbine 10 and are caused to rotate. Due to their being supported by spinner 300, rotor blades 400 when rotating cause spinner 300 to rotate about rotation axis R thereby to cause rotational motion that can be converted in a well-known manner into usable electrical or mechanical power. In this sense, rotor blades 400 are each structures adapted to traverse a fluid environment, where the fluid in this embodiment is ambient air. Nacelle 200 may be rotatably mounted to tower 100 such that nacelle 200 can rotate about a substantially vertical axis (not shown) with respect to tower 100, thereby to enable rotor blades 400 to adaptively face the direction from which incident wind W, is approaching wind turbine 10. A nose cone 500 of generally a uniform paraboloidal shape is shown mounted to a front end of spinner 300 to deflect incident wind W, away from spinner 300.

Figure 2:
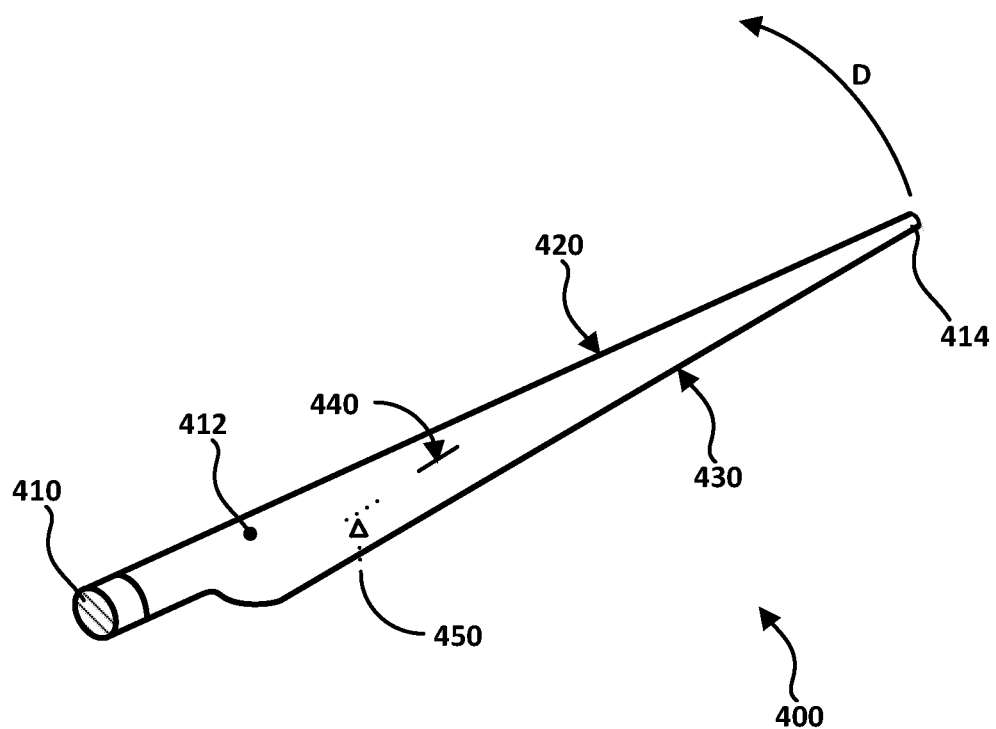
FIG. 2 is a front perspective view of one of the rotor blades of the wind turbine of FIG. 1, in isolation.

FIG. 2 is a front perspective view of one of rotor blades 400 in isolation. Rotor blade 400 includes an elongate body that extends from a root 410 through a main section 412 to terminate at a wingtip 414. Root 410 extends from nacelle 200 when attached thereto or integrated therewith, whereas wingtip 414 is the portion of the elongate body that is distal to nacelle 200. The elongate body has a leading edge 420 and a trailing edge 430, where leading edge 420 leads trailing edge 430 when rotor blade 400 is in motion rotating with nacelle 200 about rotation axis R in the direction D. A suction side 440 of the elongate body is shown in FIG. 2, and a pressure side 450, shown in dotted lines, is opposite the elongate body from suction side 440.

Figure 3:
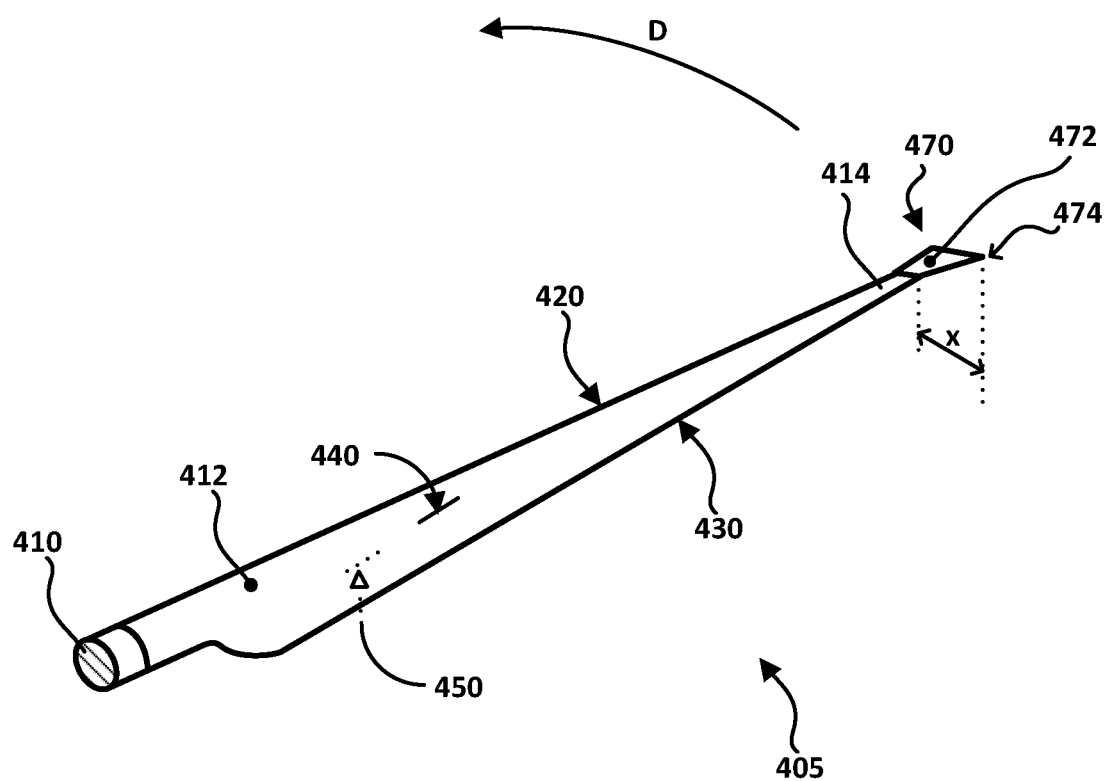
FIG. 3 is a front perspective view of a structure in accordance with an embodiment of the invention, in isolation.

FIG. 3 is a front perspective view of a structure 405 in accordance with one embodiment of the invention, shown in isolation. Structure 405 may be employed as a rotor blade and includes an elongate body that extends from a root 410 through a main section 412 to terminate at a wingtip 414. Root 410 of structure 405 extends from nacelle 200 when attached thereto or integrated therewith, and wingtip 414 is the portion of the elongate body that is distal to nacelle 200. The elongate body of structure 405 has a leading edge 420 and a trailing edge 430, where leading edge 420 leads trailing edge 430 when, for example, structure 405 is in motion rotating with nacelle 200 about rotation axis R in the direction D. Like rotor blade 400, the elongate body of structure 405 has a pressure side 440 and a suction side 450.

In accordance with an aspect of the invention, structure 405 also includes a rigid winglet 470 that is associated with the wingtip 414. In this embodiment, rigid winglet 470 is integral with the wingtip 414. Rigid winglet 470 has a planar winglet body 472 substantially normal to and, in this embodiment, extending from, suction side 440 of the elongate body to a termination point, or tip, 474 that is rearward of the trailing edge 430. Planar winglet body 472 is aligned with the tangent of the circle traversed by the winglet 470 during movement in direction D about rotation axis R, thereby to present a thin edge to the air it moves through during rotation. As shown, termination point 474 is rearward of trailing edge 430 by a distance x. It is to be understood that the distance x as shown in the figures does not necessarily have to be the same across all embodiments.

Winglet 470 is configured to have a termination point 474 that is rearward of trailing edge 430 of rotor blade 405 in order to allow vortex shedding at this region to be gradual and less abrasive when compared to prior art designs. For example, instead of 'ripping' the air, the configuration shown in FIG. 3 better enables air encountered during rotation to run along winglet body 472 smoothly and with reduced resistance, thereby to reduce turbulence and noise emissions at the region of wingtip 414.

Figure 4:
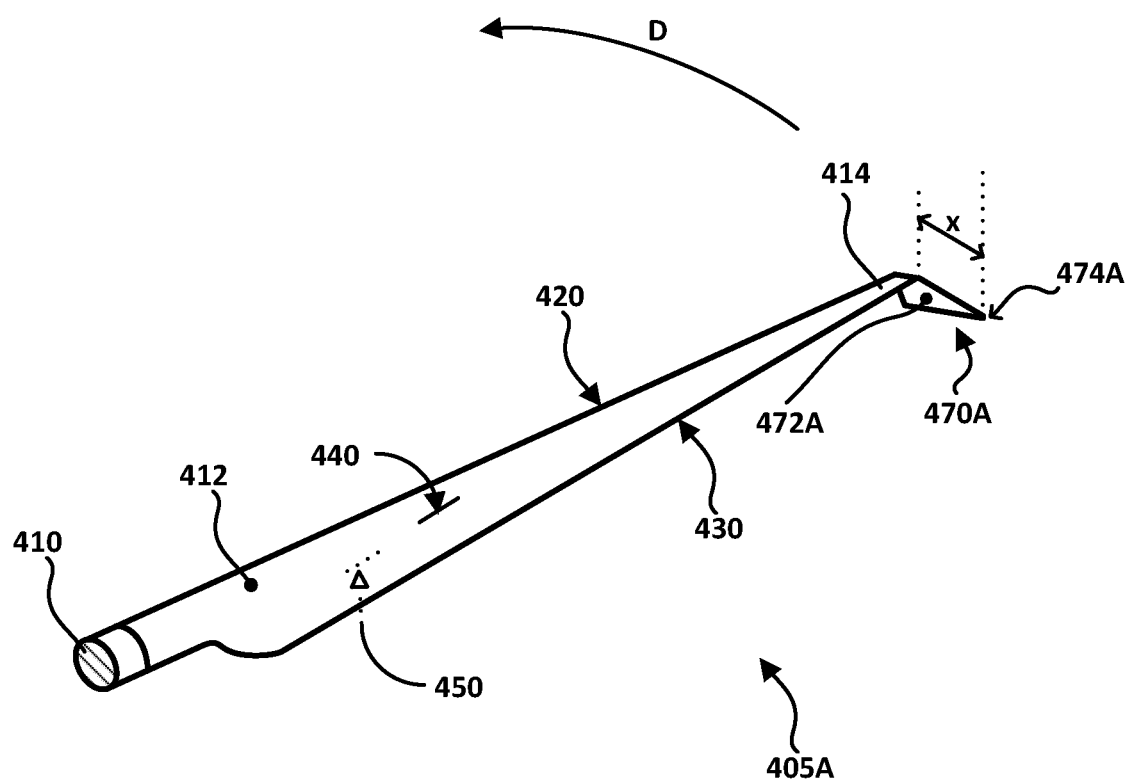
FIG. 4 is a front perspective view of a structure in accordance with another embodiment, in isolation.

FIG. 4 is a front perspective view of a structure 405A in accordance with an alternative embodiment of the invention, shown in isolation. Like structure 405, structure 405A includes an elongate body that extends from a root 410 through a main section 412 to terminate at a wingtip 414. Root 410 of structure 405A extends from nacelle 200 when attached thereto or integrated therewith, and wingtip 414 is distal to nacelle 200. The elongate body of structure 405A also has a leading edge 420 and a trailing edge 430, where leading edge 420 leads trailing edge 430 when structure 405A is in motion such as for example when rotating with nacelle 200 about rotation axis R in the direction D. Like structure 405, the elongate body of structure 405A has a pressure side 440 and a suction side 450.

In accordance with an aspect of the invention, structure 405A includes a rigid winglet 470A associated with the wingtip 414. In this embodiment, rigid winglet 470A is integral with the wingtip 414. Rigid winglet 470A of structure 405A has a planar winglet body 472A substantially normal to and, in this embodiment, extending from, pressure side 450 of the elongate body to a termination point, or tip, 474A that is rearward of trailing edge 430. Planar winglet body 472A is aligned with the tangent of the circle traversed by the winglet 470A during movement in direction D about rotation axis R, thereby to present a thin edge to the air it moves through during rotation. As shown, termination point 474A is rearward of the trailing edge 430 by a distance x.

Like winglet 470, winglet 470A is configured to have a termination point 474A that is rearward of trailing edge 430 of structure 405A in order to allow vortex shedding at this region to be gradual and less abrasive when compared to prior art designs. For example, instead of 'ripping' the air, the configuration shown in FIG. 4 better enables air encountered during rotation to run along winglet body 472A smoothly and with reduced resistance, thereby to reduce turbulence, drag and noise emissions at the region of wingtip 414.

Rigid winglets 470 and 470A represent very simple embodiments, for which numerous alternatives are contemplated.

Figure 5A:
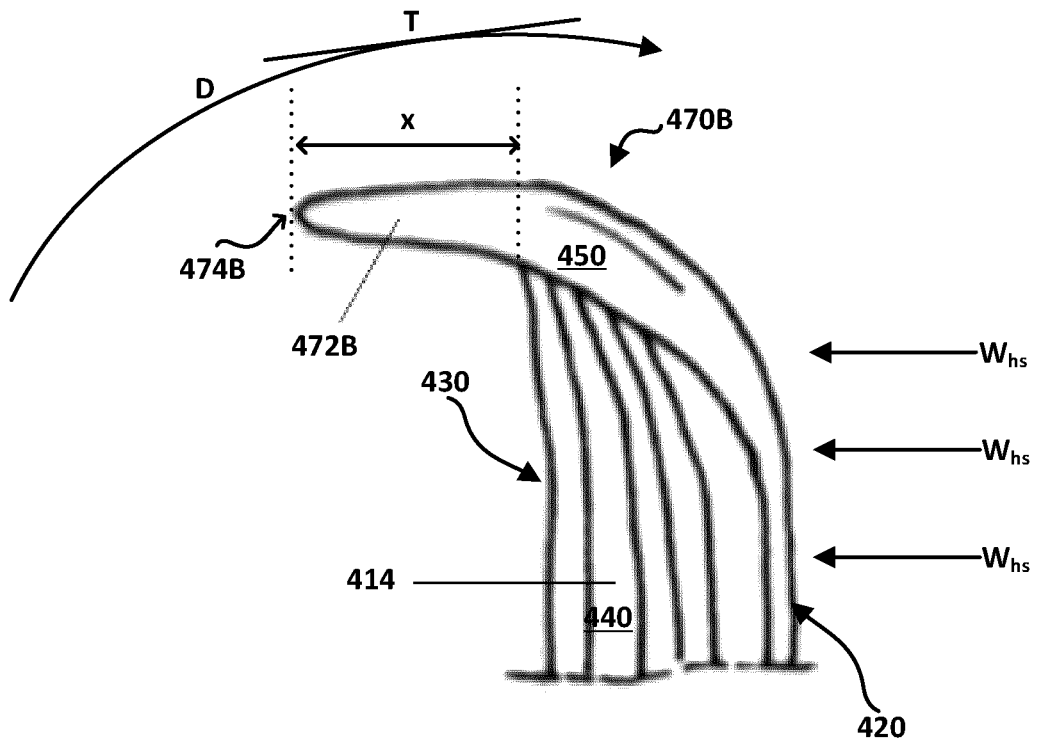
FIG. 5A is a front view of a wingtip region of a structure in accordance with another embodiment, in isolation.

For example, FIG. 5A is a front view of a wingtip region of a structure such as a rotor blade, as an observer might see it when standing facing the front of a horizontal wind turbine of which the rotor blade is a part—in accordance with another embodiment, in isolation. This structure is configured to be rotated clockwise in the direction D.

In this embodiment, the structure has a leading edge 420 slicing at high speed into wind $W_{hs}$ during rotation, a trailing edge 430, and a wingtip 414. A rigid winglet 470B is integral with wingtip 414 and extends smoothly from wingtip 414 by gently twisting so as to curve upwards while sweeping backwards with respect to the direction of rotation D so as to extend substantially normal to the suction side 440 (out of the page ie., towards the observer). The rigid winglet 470B continues to twist a total of about 180 degrees (to reveal the pressure side 450) and sweep backwards to a termination point, or tip, 474B, which is rearward of the trailing edge 430 by a distance x. The termination point 474B points away from the wind $W_{hs}$. Winglet body 472B is substantially planar and is generally parallel to the tangent T of the circle traversed by the winglet 470B during movement of a turbine.

Without being bound by a particular theory, it is believed that the twisted configuration of the rigid winglet 470B contributes to the formation of laminar flow that reduces the intensity of vortex shedding and accordingly the noise due to vortex shedding.

Figure 5B:
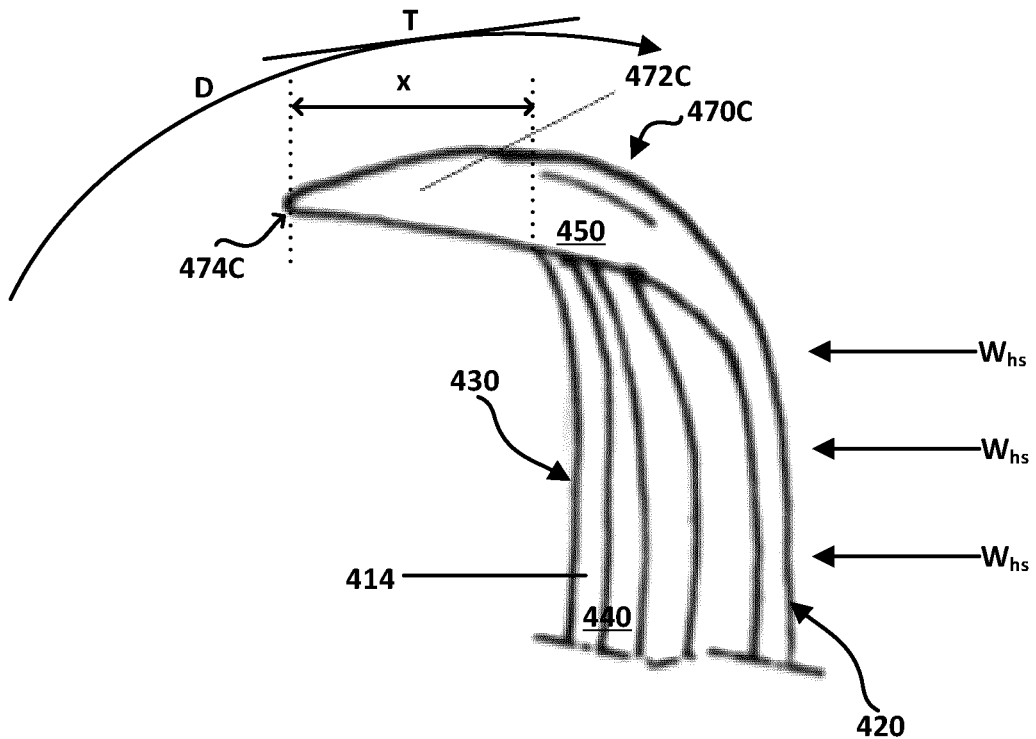
FIG. 5B is a front view of a wingtip region of a structure in accordance with another embodiment, in isolation.

FIG. 5B is a front view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470C is integral with wingtip 414 and extends smoothly from wingtip 414 by gently twisting so as to curve upwards while sweeping backwards with respect to the direction of rotation D so as to extend substantially normal to the suction side 440 (out of the page ie., towards the observer). The rigid winglet 470C continues to twist a total of about 180 degrees (to reveal the pressure side 450) and sweep backwards to a termination point, or tip, 474C, which is rearward of the trailing edge 430 by a distance x. Termination point 474C is sharper than termination point 474B but, like termination point 474B, termination point 474C points away from the wind $W_{hs}$. Winglet body 472C is substantially planar and is generally parallel to the tangent T of the circle traversed by the wingtip during movement of a turbine.

Figure 6:
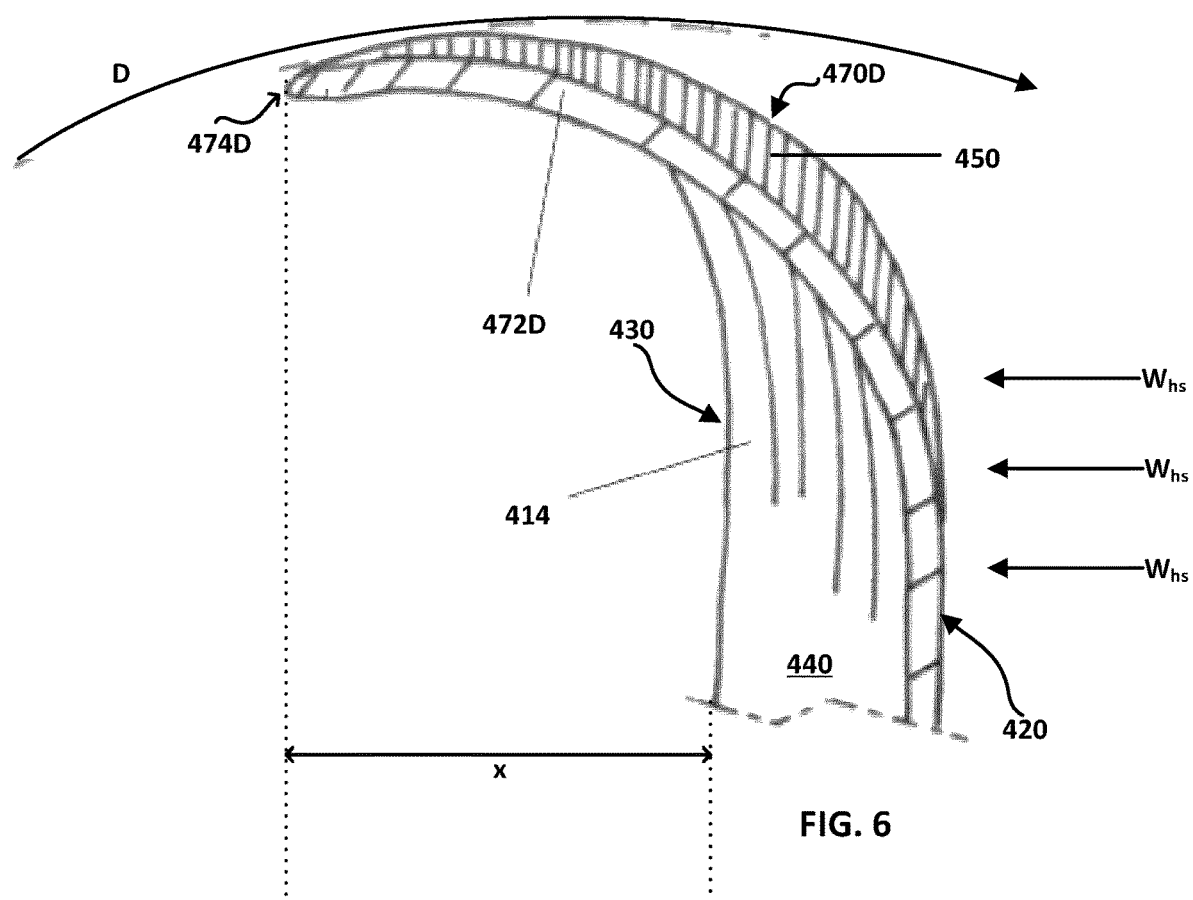
FIG. 6 is a front view of a wingtip region of a structure in accordance with another embodiment, in isolation.

FIG. 6 is a front view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470D is integral with wingtip 414 and extends smoothly from wingtip 414 by gently twisting so as to curve upwards while sweeping backwards with respect to the direction of rotation D so as to extend substantially normal to the suction side 440 (out of the page ie., towards the observer). The rigid winglet 470D continues to twist a total of about 180 degrees (to reveal the pressure side 450) and sweep backwards to a termination point, or tip, 474D, which is rearward of the trailing edge 430 by a distance x. In this embodiment, winglet body 472D is slightly curved, or arced, and generally conforms to an arc of circumference of a circle traversed in the direction D by the winglet 470D during movement of a turbine.

Figure 7:
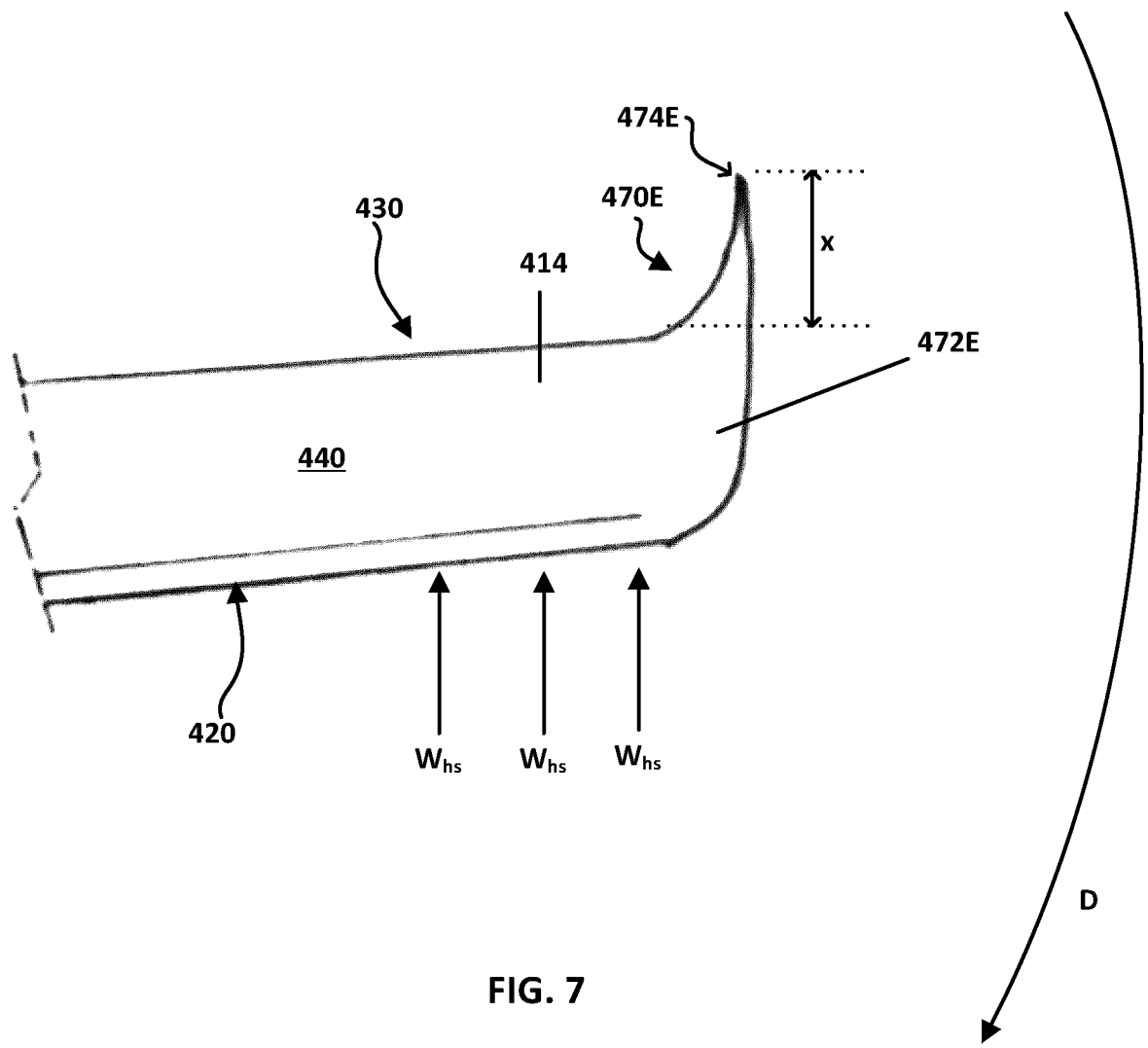
FIG. 7 is a front view of a wingtip region of a structure in accordance with another embodiment, in isolation.

FIG. 7 is a front view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470E is integral with wingtip 414 and extends smoothly from wingtip 414 by gently twisting so as to curve upwards while sweeping backwards with respect to the direction of rotation D so as to extend substantially normal to the suction side 440 (out of the page ie., towards the observer). The rigid winglet 470E continues to twist a total of about 180 degrees and sweep backwards to a termination point, or tip, 474E, which is rearward of the trailing edge 430 by a distance x. Winglet body 472E is substantially planar and is generally parallel to the tangent of the circle traversed by the winglet 470E during movement of a turbine.

Figure 8:
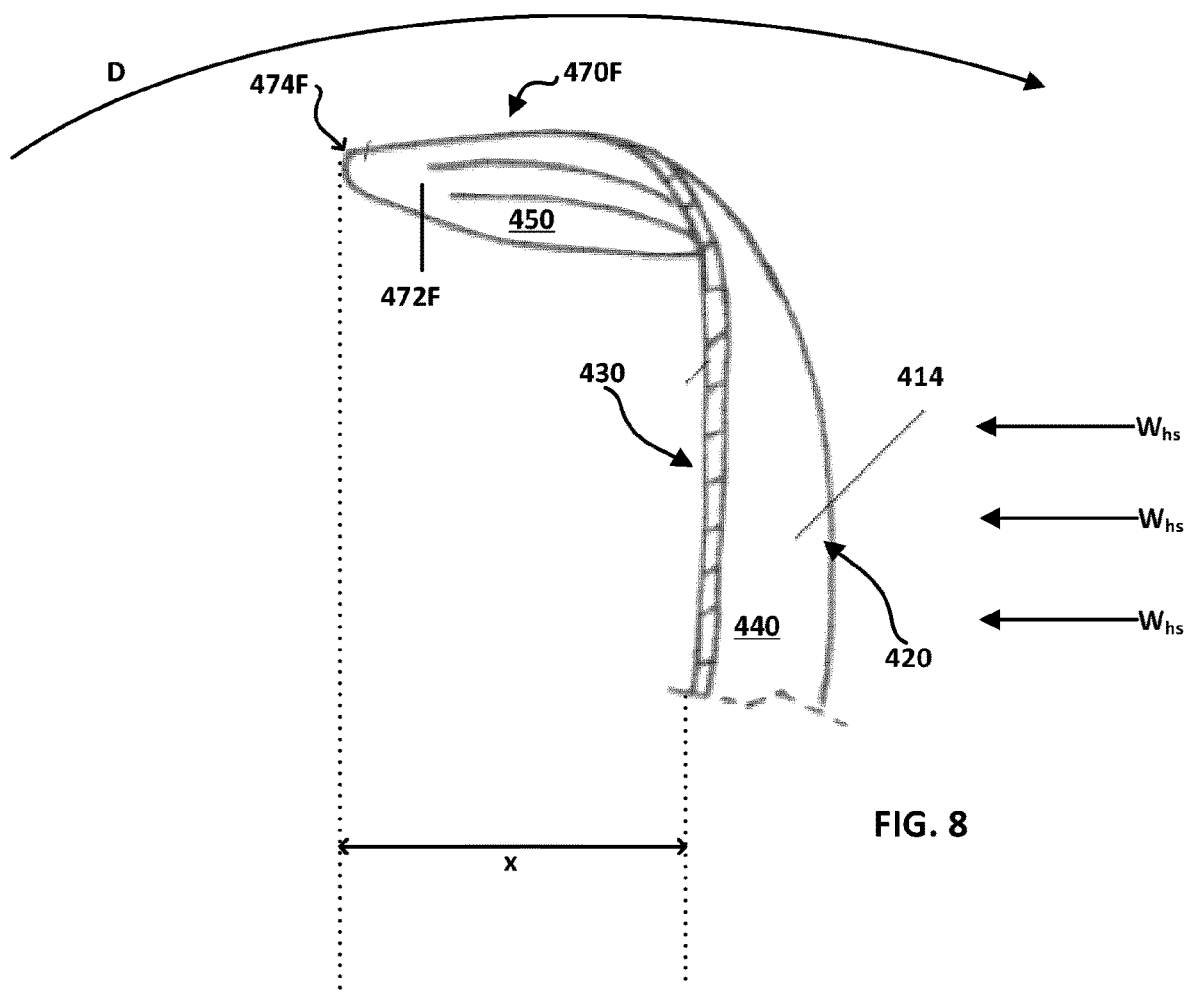
FIG. 8 is a front view of a wingtip region of a structure in accordance with another embodiment, in isolation.

FIG. 8 is a front view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470F is integral with wingtip 414 and extends smoothly from wingtip 414 by gently twisting so as to curve downwards while sweeping backwards with respect to the direction of rotation D so as to extend substantially normal to the pressure side 450 (into the page ie., away from the observer). The rigid winglet 470F continues to twist a total of about 180 degrees (to reveal the suction side 450) and sweep backwards to a termination point, or tip, 474F, which is rearward of the trailing edge 430 by a distance x. In this embodiment, winglet body 472F is substantially planar and is generally parallel to the tangent of the circle traversed by the winglet 470F during movement of a turbine.

Figure 9A:
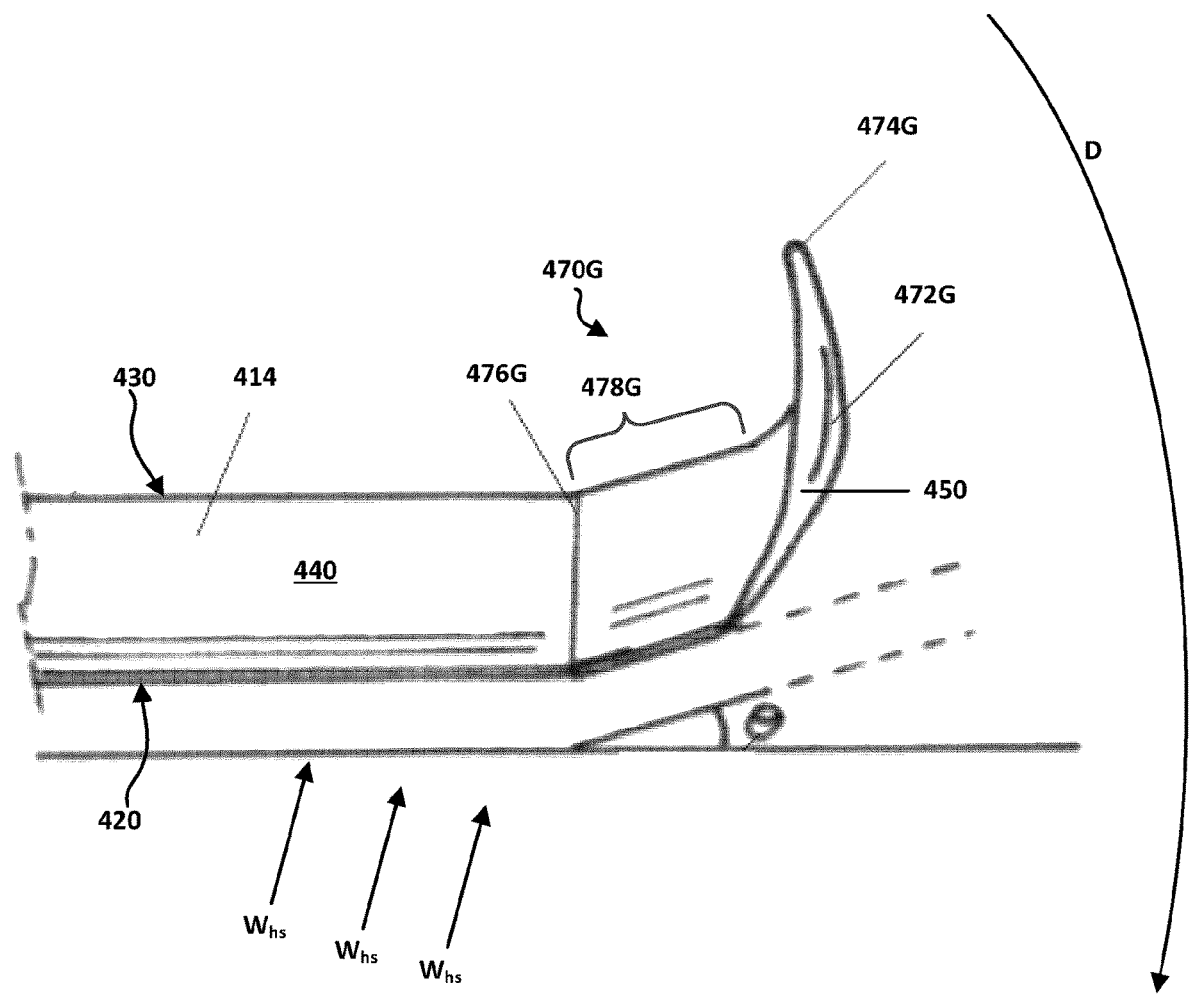
FIG. 9A is a side elevation view of a wingtip region of a structure in accordance with another embodiment, in isolation.

FIG. 9A is a side elevation view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470G is integral with wingtip 414 and extends from a linear connection mechanism 476G through a planar transition region 478G from wingtip 414 before gently twisting so as to curve upwards while sweeping backwards with respect to the direction of rotation D so as to extend substantially normal to the suction side 440 (out of the page ie., towards the observer). In this embodiment, the connection mechanism is a rigid joint retaining the rigid winglet 470G in a fixed position with respect to the wingtip 414.

The rigid winglet 470G continues to twist a total of about 180 degrees (to reveal the pressure side 450) and sweep backwards to a termination point, or tip, 474G, which is rearward of the trailing edge 430. Winglet body 472G is substantially planar and is generally parallel to the tangent of the circle traversed by the winglet 470G during movement of a turbine.

In this embodiment, planar transition region 478G is angled upwards by an angle θ from connection mechanism 476G with respect to suction side 440, and therefore extends more abruptly with respect to wingtip 414 than in other embodiments.

Figure 9B:
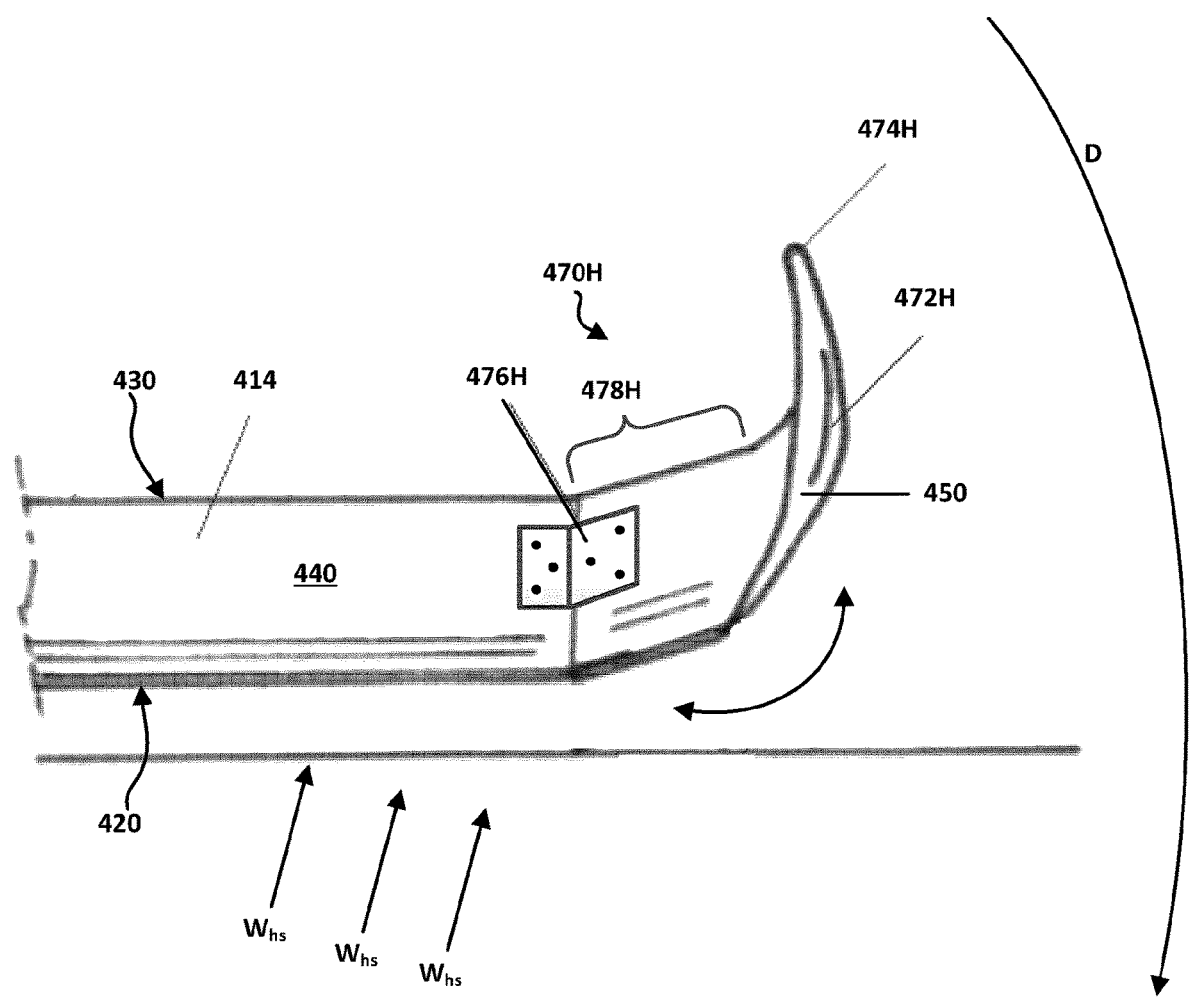
FIG. 9B is a side elevation view of a wingtip region of a structure in accordance with another embodiment, in isolation.
Figure 9B:
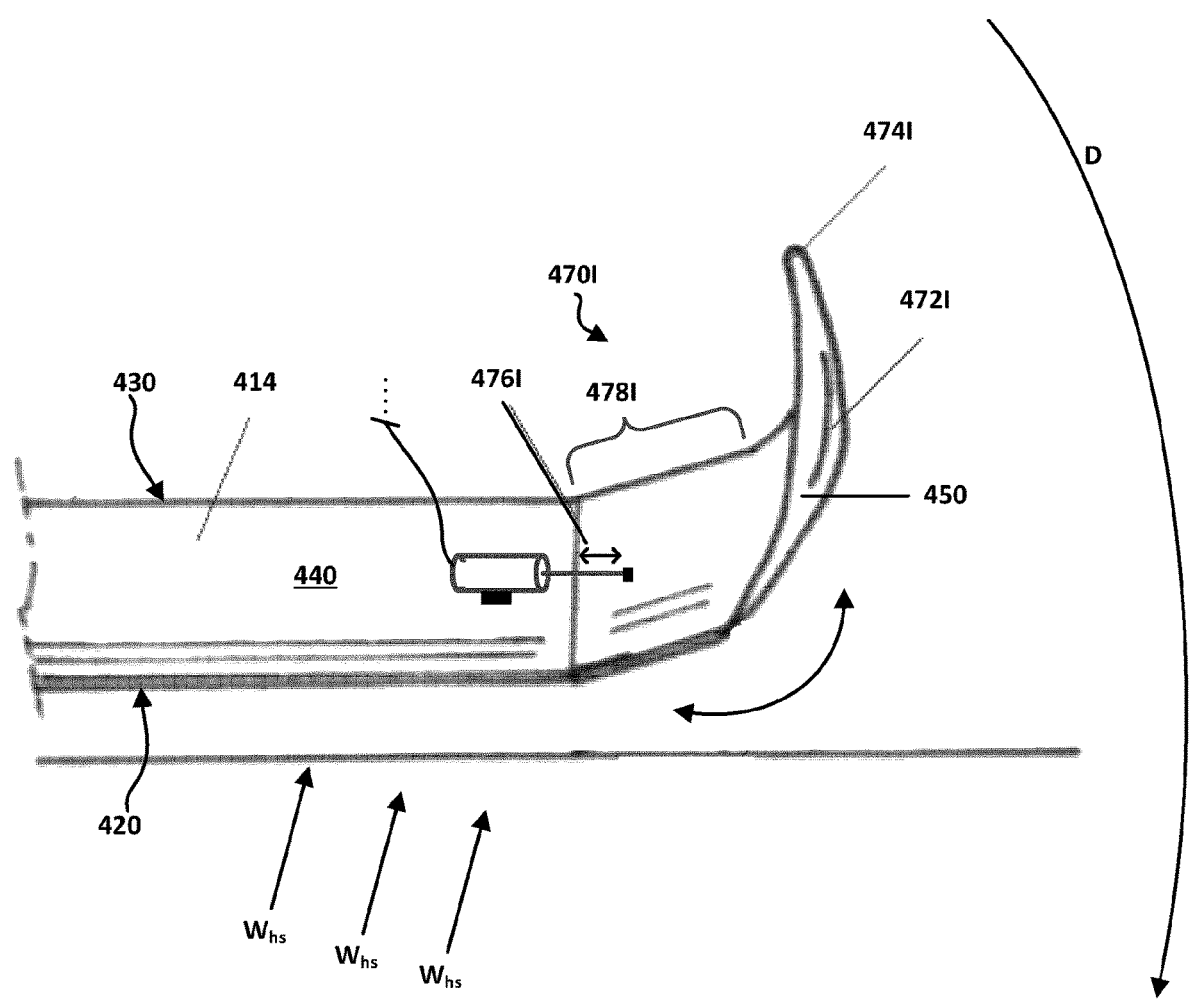

FIG. 9B is a side elevation view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470H is integral with wingtip 414 and extends from a linear connection mechanism 476H through a planar transition region 478H from wingtip 414 before gently twisting so as to curve upwards while sweeping backwards with respect to the direction of rotation D so as to extend substantially normal to the suction side 440 (out of the page ie., towards the observer). In this embodiment, the connection mechanism is a hinge permitting the rigid winglet 470H to rotate freely with respect to the wingtip 414 in response to fluid flow incident on the elongate body.

The rigid winglet 470H continues to twist a total of about 180 degrees (to reveal the pressure side 450) and sweep backwards to a termination point, or tip, 474H, which is rearward of the trailing edge 430. Winglet body 472H is substantially planar and is generally parallel to the tangent of the circle traversed by the winglet 470H during movement of a turbine.

FIG. 9C is a side elevation view of a wingtip region of a structure suitable as a rotor blade in accordance with another embodiment, in isolation. In this embodiment, the structure has a leading edge 420 slicing at high speed into wind $W_{hs}$ during rotation, a trailing edge 430, and a wingtip 414. A rigid winglet 470I is integral with wingtip 414 and extends from a linear connection mechanism 476I through a planar transition region 478I from wingtip 414 before gently twisting so as to curve upwards while sweeping backwards with respect to the direction of rotation D so as to extend substantially normal to the suction side 440 (out of the page ie., towards the observer). In this embodiment, the connection mechanism 476I is a control structure permitting the rigid winglet to 470I rotate with respect to the wingtip in response to control signals. The control structure includes a hydraulic/pneumatic pump structure connected to wingtip 414 and that can be operated to either extend or retract an arm with a distal end that is connected to planar transition region 478I. Extension of the arm using the pump structure causes the arm to push planar transition region 478I clockwise, and retraction of the arm using the pump structure causes the arm to pull planar transition region 478I counterclockwise.

The rigid winglet 470I continues to twist a total of about 180 degrees (to reveal the pressure side 450) and sweep backwards to a termination point, or tip, 474I, which is rearward of the trailing edge 430. Winglet body 472I is substantially planar and is generally parallel to the tangent of the circle traversed by the winglet 470I during movement of a turbine.

Figure 10:
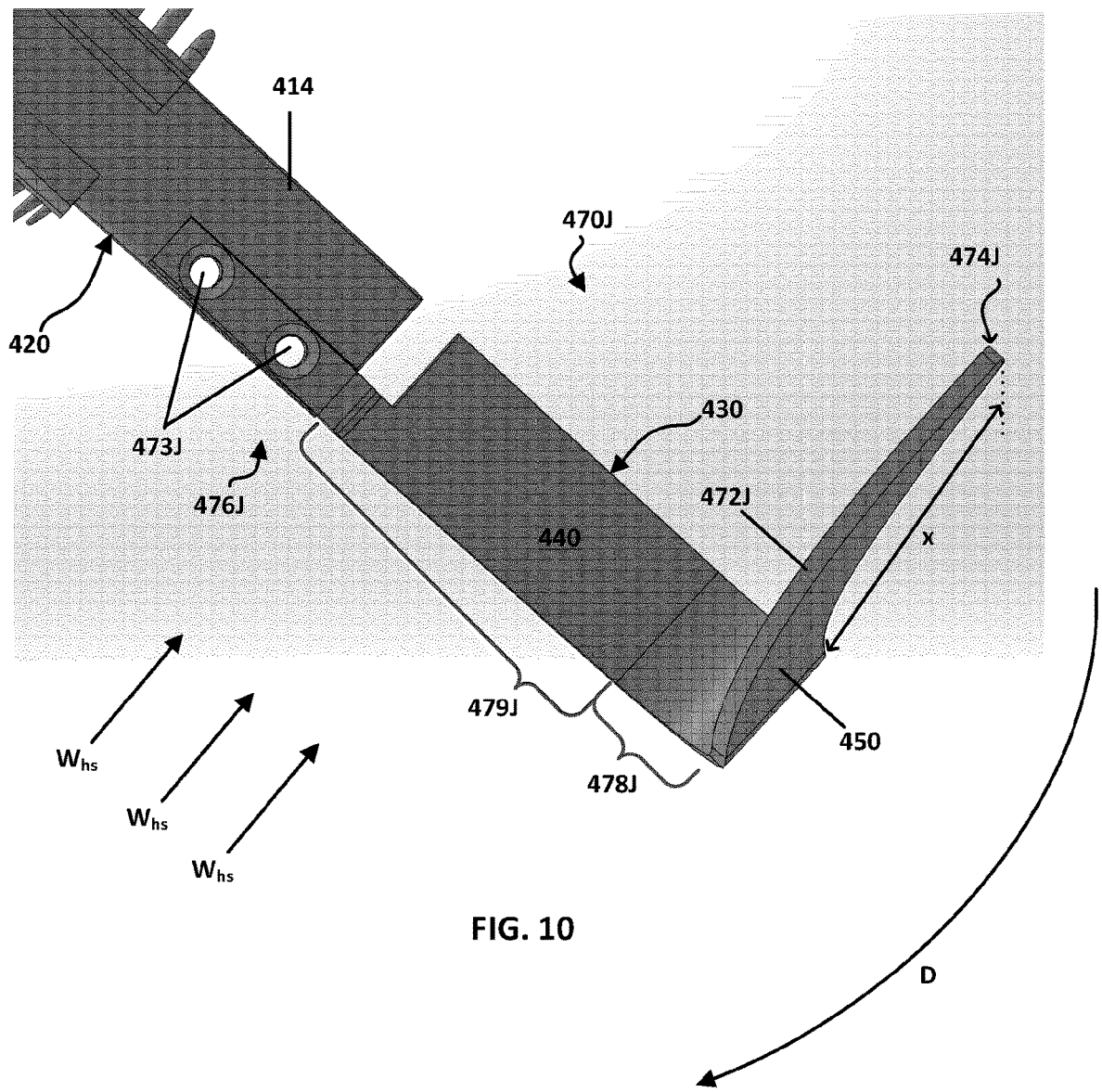
FIG. 10 is a front view of a wingtip region of a structure in accordance with another embodiment, in isolation.
Figure 11:
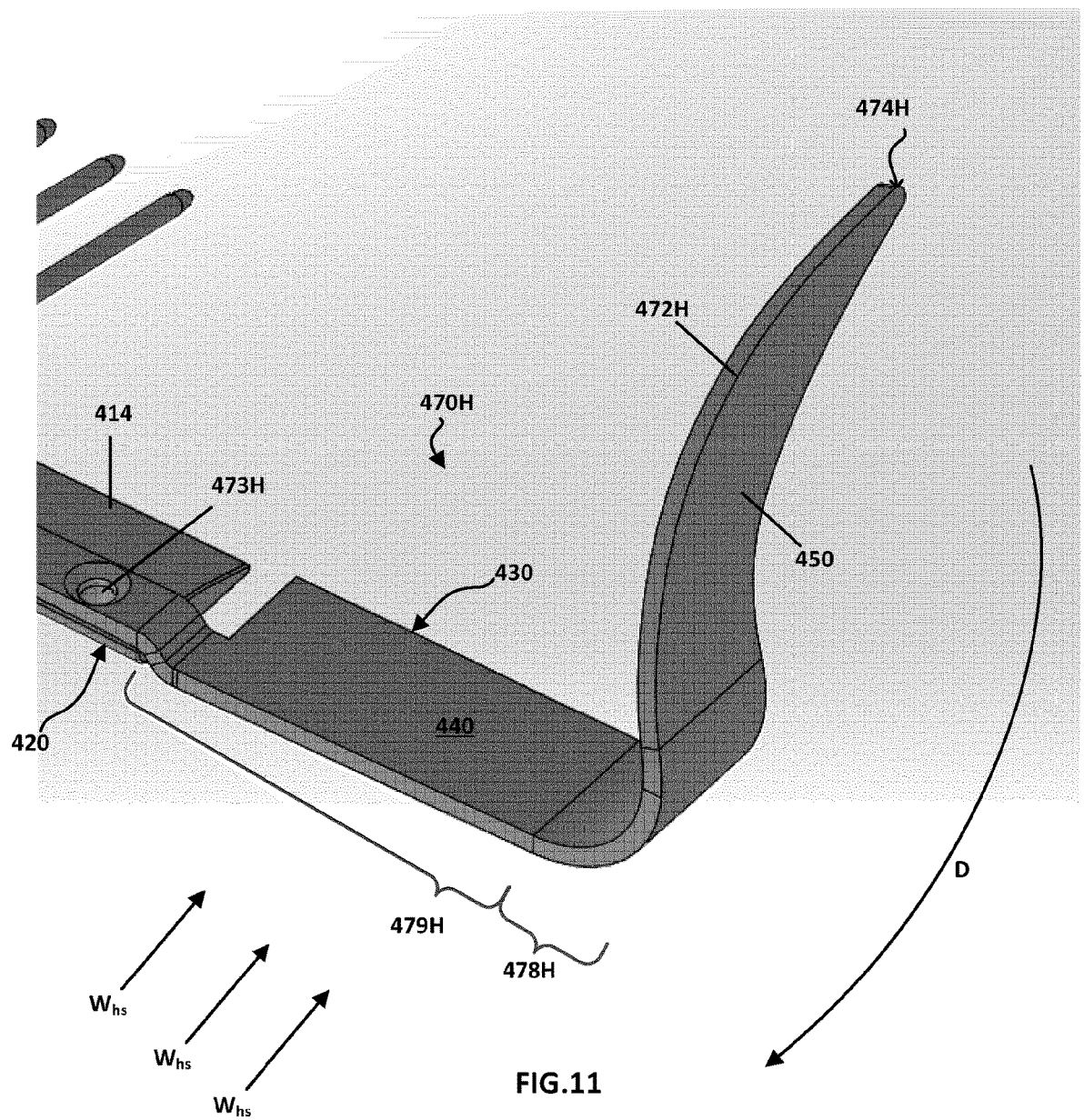
FIG. 11 is a front perspective view of the wingtip region of the structure of FIG. 10.

FIG. 10 is a front view of a wingtip region of a structure suitable as a rotor blade in accordance with another embodiment, in isolation, and FIG. 11 is a front perspective view of the wingtip region of FIG. 10.

In this embodiment, the structure has a leading edge 420 slicing at high speed into wind $W_{hs}$ during rotation, a trailing edge 430, and a wingtip 414. A rigid winglet 470J is attachable to wingtip 414 using rigid connection mechanism 476J at connection points 473J using suitable fasteners passed through both the rigid winglet 470J and the wingtip 414. In this embodiment, rigid connection mechanism 476J is a rigid bar incorporating connection points 473J which are, in this embodiment, holes through the rigid bar. In this embodiment connection mechanism 476J is formed of metal and is integral with a planar extension region 479J through which rigid winglet 470J extends. Planar extension region 479J is intermediate the connection mechanism 476J and a transition region 478J. In this embodiment, transition region 478J is curved between extension region 479J and winglet body 472J so as to smoothly transition to winglet body 472J from wingtip 414. In this embodiment, winglet body 472J is not twisted but is swept backwards with respect to the direction of rotation D so as to extend substantially normal to the suction side 440 (out of the page ie., towards the observer). The rigid winglet 470J continues to sweep backwards to a termination point, or tip, 474J, which is rearward of the trailing edge 430 by a distance x. In this embodiment, winglet body 472J is substantially planar and is generally parallel to the tangent of the circle traversed by the winglet 470J during movement of a turbine.

In FIG. 11, it can be seen that the connection mechanism 476J is stepped in the region of the distal end of wingtip 414 thereby to ensure transition region 479J is primarily in the same plane as wingtip 414.

The configurations of winglets disclosed herein have been provided to decrease noise emissions and to improve the operational efficiency of horizontal wind turbines through reduction of vortex tip shedding and associated sound waves.

Test Results

Tests were conducted of a small scale wind turbine with structures for traversing a fluid-environment as described herein, from various distances from a source of incident wind and various power levels, for each of: prior art structures with no winglet, prior art structures with winglet, structures according to the present invention with a rigid winglet associated with a wingtip having a winglet body extending substantially normal to one of a suction side and a pressure side of the elongate body to a termination point that is rearward of the trailing edge. The test results demonstrated a subtle increase in power output at various wind speeds and distances from the wind source with a standard winglet and even higher power output differences resulting from structures according to the present invention.

1. 20 cm From Incident Wind Source, Power Level 2
  A. Regular wind turbine (No winglet)—148 mV
  B. Regular wind turbine (Winglet coming out)—150 mV
  C. Regular wind turbine (Winglet behind trailing edge)—156 mV
2. 30 cm From Incident Wind Source, Power Level 2
  A. Regular wind turbine (No winglet)—135 mV
  B. Regular wind turbine (Winglet coming out)—136 mV
  C. Regular wind turbine (Winglet behind trailing edge)—141 mV 3. 50 cm Away From Incident Wind Source, Power Level 2
   A. Regular wind turbine (No winglet)—115 mV
   B. Regular wind turbine (Winglet coming out)—116 mV
   C. Regular wind turbine (Winglet behind trailing edge)—121 mV
   20 cm Away From Incident Wind Source, Power Level 3
   Regular wind turbine (No winglet)—158 mV
   Regular wind turbine (Winglet coming out)—160 mV
   Regular wind turbine (Winglet behind trailing edge)—165 mV
   30 cm Away From Incident Wind Source, Power Level 3
   Regular wind turbine (No winglet)—142 mV
   Regular wind turbine (Winglet coming out)—143 mV
   Regular wind turbine (Winglet behind trailing edge)—149 mV
   50 cm Away From Incident Wind Source, Power Level 3
   Regular wind turbine (No winglet)—127 mV
   Regular wind turbine (Winglet coming out)—130 mV
   Regular wind turbine (Winglet behind trailing edge)—136 mV The above-described rotor blade configurations improvements to the winglet of a rotor blade for a horizontal-axis wind turbine can also be applied to one or more rotor blades usable for vertical-axis wind turbines, and both of any scale, or to one or more rotor blades usable in hydroelectric dam turbines, gas turbines, tidal turbines or airborne wind energy turbines or in other kinds of turbines dealing with fluid flow whether of gas or of liquid.

The above-described rotor blade configurations may alternatively be employed in aircraft such as commercial airliners, military jet aircraft, helicopter blades, helicopter wings, civilian airplanes, drones, and other similar aircraft. The invention or inventions described herein may be applied to wind turbines having fewer or more blades than described by way of example in order to increase the operational efficiency of a wind turbine, to decrease maintenance costs, and to increase the scalability and marketability of such wind turbines.

It is observed that commercial airliners, civilian airplanes, drones, helicopter wings would have a winglet of similar size ratio to those of modern commercial airliners, with an architecture that bends back beyond the line of the trailing edge.

However, military jet aircraft, helicopter blades, would likely employ a similar winglet that is in size in comparison to blade length due to the wingtip speed that would be incurred. For scale reference, a helicopter rotor is roughly ⅓ the size of a commercial airliner, with similar tip speed, the size would be ⅓ that of an airliner's winglet.

Although embodiments have been described with reference to the drawings, those of skill in the art will appreciate that variations and modifications may be made without departing from the spirit and scope thereof as defined by the appended claims.

For example, a rigid winglet as described herein may be further equipped to integrate into the lightning protection system of a rotor blade and may contain miniature projections that reduce impact forces of rain and snow, thus limiting erosion and blade failure.

Figure 12A:
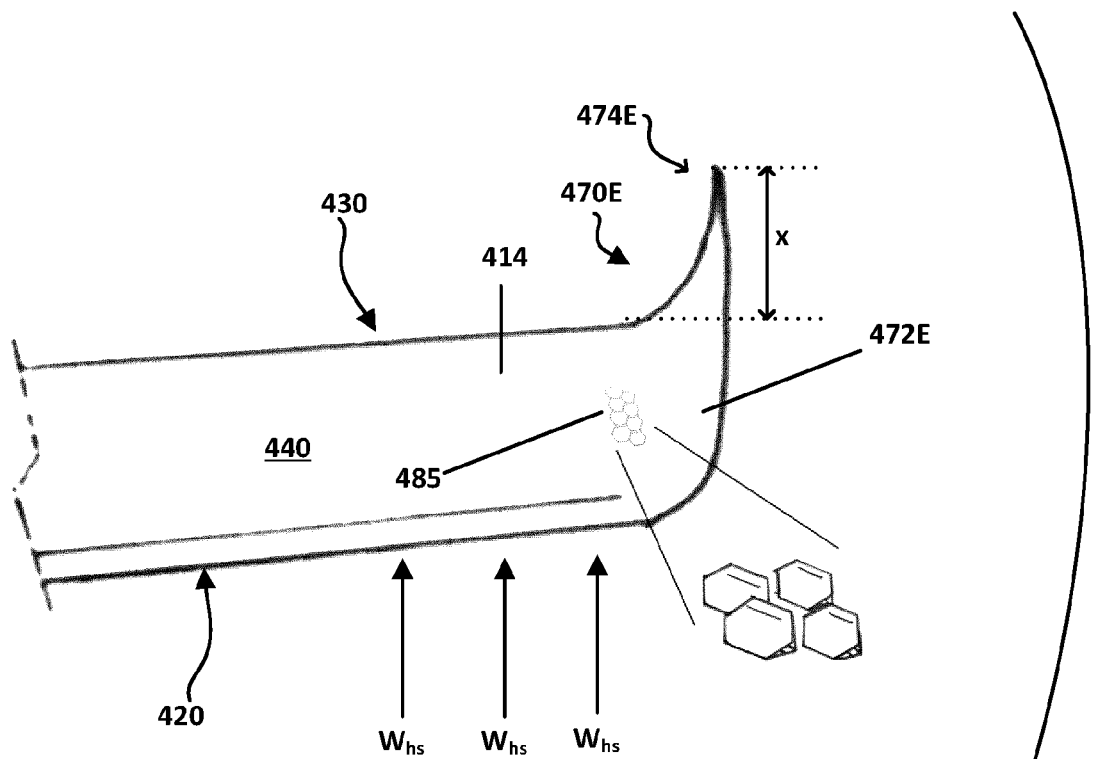
FIG. 12A is a front view of a wingtip region of the structure shown in FIG. 7 in isolation, additionally with a hexagonal-patterned surface treatment applied to a suction side.
Figure 12B:
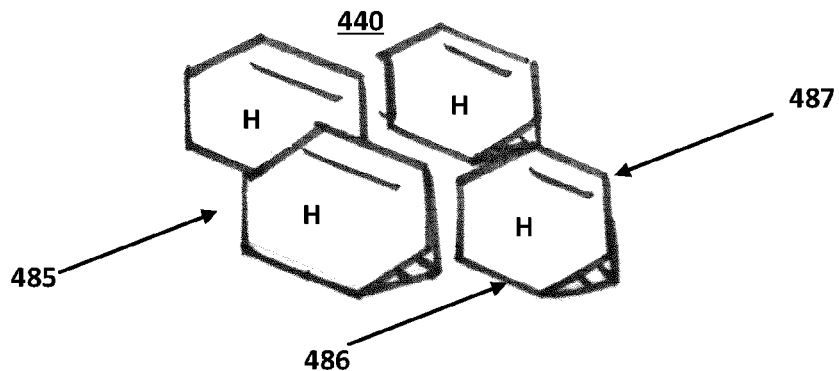
FIG. 12B shows an enlarged portion of the hexagonal-patterned surface treatment in isolation.

Furthermore, a winglet may be provided with a surface treatment such as a series of dimples and/or a series of hexagonal patterns and/or a series of troughs or grooves, all of which may either be sunk into the surface or raised above the surface of the winglet. For example, FIG. 12A is a front view of a wingtip region of a structure in isolation, with a hexagonal-patterned surface treatment 485 applied to the suction side 440. FIG. 12B shows an enlarged portion of the hexagonal-patterned surface 485 in isolation. As shown, each hexagon H is wedge-shaped in cross-section, with the thin edge of the wedge 486 facing towards the source of incident wind Wi thereby to form somewhat of a ramp upwards from suction side 440, and the thick end of the wedge 487 facing away from the source of incident wind Wi thereby to be spaced from suction side 440.

Such improvements may apply equally well, mutatis mutandis, with such mutations as being relevant, including but not limited to, commercial airliners, military jet aircraft, helicopter blades, helicopter wings, civilian airplanes, spacecraft, drones, and other things.

Furthermore, the structures disclosed herein are usable in other fluid environments besides ambient air, such as water environments, oil environments and so forth.

Figure 13:
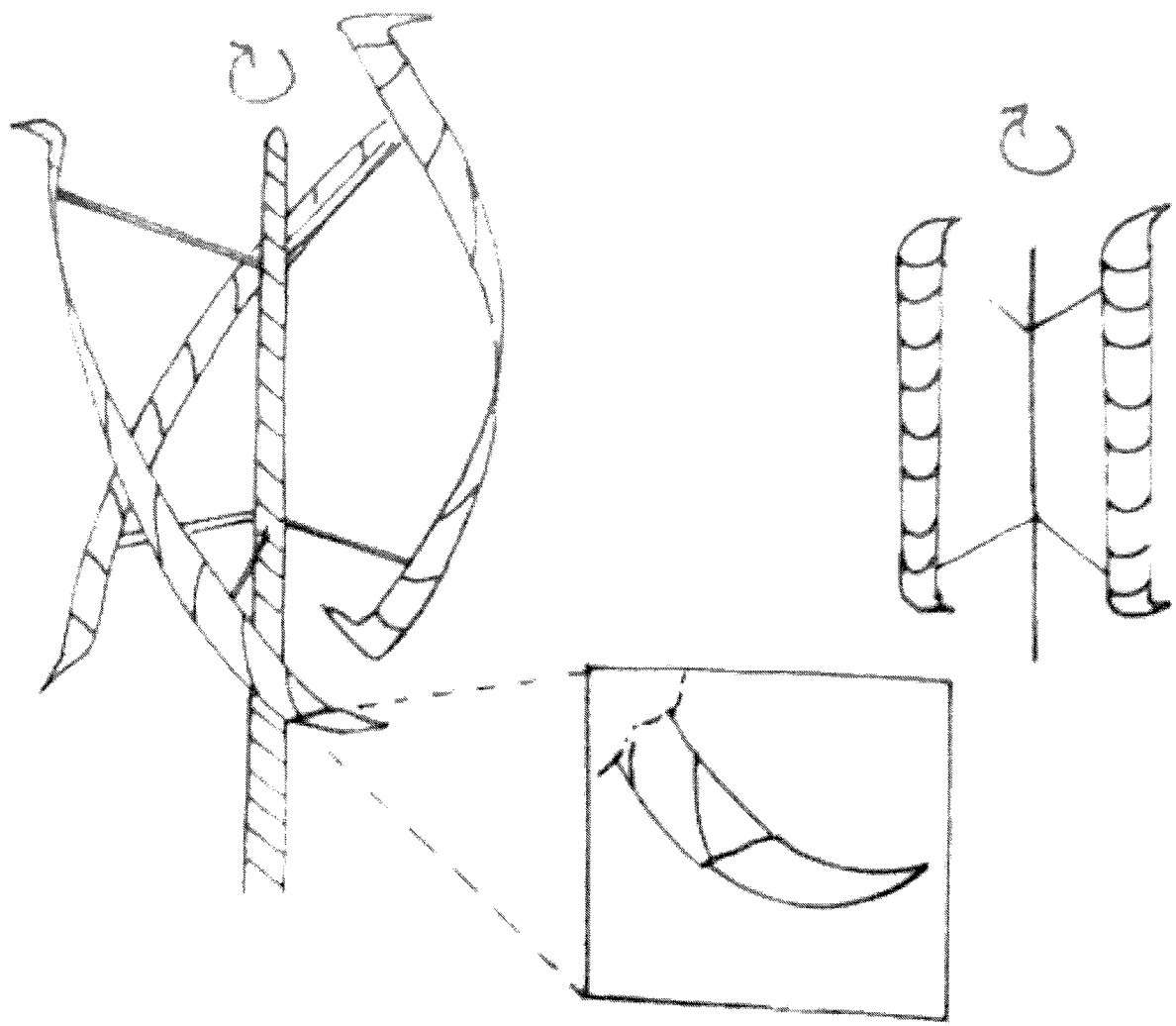
FIG. 13 is a front perspective view of structures adapted to traverse a fluid environment for application to a vertical-axis wind turbine.

The structure adapted to traverse a fluid environment may be applied to a vertical-axis wind turbine. In such an embodiment, the rigid winglet departs from the lower and upper region of the blade, as shown generally in FIG. 13. This winglet can spiral any of: in toward the central shaft of the wind turbine, or flare out and away from the shaft. In this application, these novel winglets may also flare directly back from the direction of rotation.

The structure adapted to traverse a fluid environment may be applied to a hydroelectric dam turbine. In such an embodiment, the winglet departs from the tip at the trailing edge, as these blades are generally quite wide in comparison to their length. The curl as described in the art of this patent would begin generally at the leading edge tip, and slowly increase in severeness of curl as it moves towards the trailing edge, terminating beyond it, where the curl is not more than 140 degrees.

The structure adapted to traverse a fluid environment may be applied to a gas turbines. In such an embodiment, the curl as described in the art of this patent begins generally at the leading edge tip, and slowly increases in severeness of curl as it moves towards the trailing edge, terminating beyond it. The termination however, in this case, would occur at an angle more towards the suction side, such to be in line with the flow of gas, and to induce a less turbulent flow onto the next set of blades.

The structure adapted to traverse a fluid environment may be applied to a tidal turbines. In such an embodiment, the winglet departs the tip in the same manner as the wind turbine, as described. This is most certainly true for tidal turbines that use a apparatus the is highly analogous to wind turbines. In cases where the tidal turbine is incased in a shell, with a multiple of fins extending from the outer circumference of the shell towards an inner portion of a shell, the winglets resemble those of the hydroelectric turbines, except that the winglets would be in the central region of the shell, and not at an outer circumference.

The structure adapted to traverse a fluid environment may be applied to an airborne airborne wind energy turbine. In such an embodiment, the winglets may be applied to both the wing of the kite itself, and to the power generating device, which is most often a propeller. In the case of the wing, that enables the kite to fly, the winglet would resemble those as applied to an aircraft, which have a similar shape to those of the wind turbine as described. In the case of the power generating device, which is most often a propeller, the winglet is similar to the hydroelectric dam turbines.

The structure adapted to traverse a fluid environment may be applied to a commercial airliner, with the winglet having a similar shape to those of the wind turbine described above.

The structure adapted to traverse a fluid environment may be applied to a military jet aircraft and to a spacecraft, with the winglets would be smaller then those seen on a commercial airline.

The structure adapted to traverse a fluid environment may be applied to a helicopter blade, wherein the winglet would curl down towards the ground and terminate rearwards the trailing edge.

The structure adapted to traverse a fluid environment may be applied to helicopter wings, where the winglet would curl up towards the sky and terminate rearwards the trailing edge.

The structure adapted to traverse a fluid environment may be applied to wings of civilian airplanes, where the winglet contains a similar shape to those of the wind turbine as described.

The structure adapted to traverse a fluid environment may be applied to wings of a drone, with the winglet contains a similar shape to those of the wind turbine as described.

It is observed that commercial airliners, civilian airplanes, drones, helicopter wings and helicopter blades would have a winglet of similar size ratio to those of modern commercial airliners, with an architecture that bends back beyond the line of the trailing edge. For scale reference, a helicopter rotor is roughly ⅓ the size of a commercial airliner, with similar tip speed, the size would be ⅓ that of an airliner's winglet.

However, military jet aircraft would likely employ a smaller winglet size as compared to those commercial aviation due to the wingtip speed that would be incurred. For scale reference, a military jet aircraft wing is roughly ⅓ the size of a commercial airliner, with much higher tip speed, the size would be less than ⅓ that of an airliner's winglet.

It should be noted that the term 'comprising' does not exclude other elements or steps and the use of articles "a" or "an" does not exclude a plurality. Also, elements described in association with different embodiments may be combined. It should be noted that reference signs in the claims should not be construed as limiting the scope of the claims.

What is claimed is:

1. A structure adapted to traverse a fluid environment, the structure comprising:
    an elongate body having a root, a wingtip, a leading edge and a trailing edge; and
    a rigid winglet associated with the wingtip and having a winglet body extending normal to one of a suction side and a pressure side of the elongate body to a termination point that is rearward of the trailing edge;
    wherein the winglet body is arced and conforms to an arc of circumference of a circle traversed by the winglet during movement of the elongate body about a rotational axis; and
    wherein the winglet body is integral with the wingtip and extends from the wingtip by twisting such that the winglet curves upwards while sweeping backwards with respect to a direction of rotation;
    wherein the twist of the winglet is 180 degrees.

2. The structure of claim 1, wherein the rigid winglet and the elongate body are an integral structure.

3. The structure of claim 1, wherein the rigid winglet and the elongate body are connected to each other.

4. The structure of claim 1, wherein the twist reveals the pressure side of the rigid winglet.

5. The structure of claim 1, wherein the twist of the winglet reveals the pressure side of the elongate body.

6. The structure of claim 1, wherein the rigid winglet further comprises:
    a transition region intermediate the wingtip and the winglet body; and
    a connection mechanism linking the transition region to the wingtip wherein the connection mechanism includes at least one of a rigid joint, a hinge, pneumatic pump, a hydraulic pump, and a rigid bar.

7. The structure of claim 6, wherein the connection mechanism comprises:
    a rigid joint retaining the rigid winglet in a fixed position with respect to the wingtip.

8. The structure of claim 6, wherein at least a portion of the transition region is curved.

9. The structure of claim 6, wherein at least a portion of the transition region is planar.

10. The structure of claim 1, wherein the elongate body is an airfoil.

11. An aircraft comprising at least one structure as recited in claim 10.

12. The structure of claim 1, wherein the structure is a rotor blade.

13. A turbine comprising at least one rotor blade as recited in claim 12.

14. The turbine of claim 13, wherein the turbine is selected from the group consisting of a wind turbine, a tidal turbine, a hydroelectric dam turbine, and an airborne wind energy turbine.

15. The structure of claim 1, wherein the twist of the winglet contributes to formation of laminar flow.

16. The structure of claim 15, wherein the formation of laminar flow reduces an intensity of vortex shedding.

17. The structure of claim 15, wherein the formation of laminar flow reduces noise due to vortex shedding.

18. The structure of claim 1, wherein the structure is coupled to a wind turbine.

19. A structure adapted to traverse a fluid environment, the structure comprising:
    an elongate body having a root, a wingtip, a leading edge and a trailing edge; and
    a rigid winglet associated with the wingtip and having a winglet body extending normal to one of a suction side and a pressure side of the elongate body to a termination point that is rearward of the trailing edge;
    wherein the winglet body is arced and conforms to an arc of circumference of a circle traversed by the winglet during movement of the elongate body about a rotational axis; and
    wherein the winglet body is integral with the wingtip and extends from the wingtip by twisting such that the winglet curves upwards while sweeping backwards with respect to a direction of rotation;
    wherein the rigid winglet further comprises:
        a transition region intermediate the wingtip and the winglet body; and
        a connection mechanism linking the transition region to the wingtip; and wherein the connection mechanism comprises:
            a hinge permitting the rigid winglet to rotate freely with respect to the wingtip in response to fluid flow incident on the elongate body.

20. A structure adapted to traverse a fluid environment, the structure comprising:
    an elongate body having a root, a wingtip, a leading edge and a trailing edge; and
    a rigid winglet associated with the wingtip and having a winglet body extending normal to one of a suction side and a pressure side of the elongate body to a termination point that is rearward of the trailing edge;

wherein the winglet body is arced and conforms to an arc of circumference of a circle traversed by the winglet during movement of the elongate body about a rotational axis; and wherein the winglet body is integral with the wingtip and extends from the wingtip by twisting such that the winglet curves upwards while sweeping backwards with respect to a direction of rotation;

wherein the rigid winglet further comprises:
   a transition region intermediate the wingtip and the winglet body; and
a connection mechanism linking the transition region to the wingtip; and wherein the connection mechanism comprises:
   the pneumatic pump or the hydraulic pump permitting the rigid winglet to rotate with respect to the wingtip in response to control signals.

* * * * *